Oct. 26, 1937.  H. C. WHITTAKER  2,097,358
METAL CUTTER
Filed May 2, 1936  2 Sheets-Sheet 1
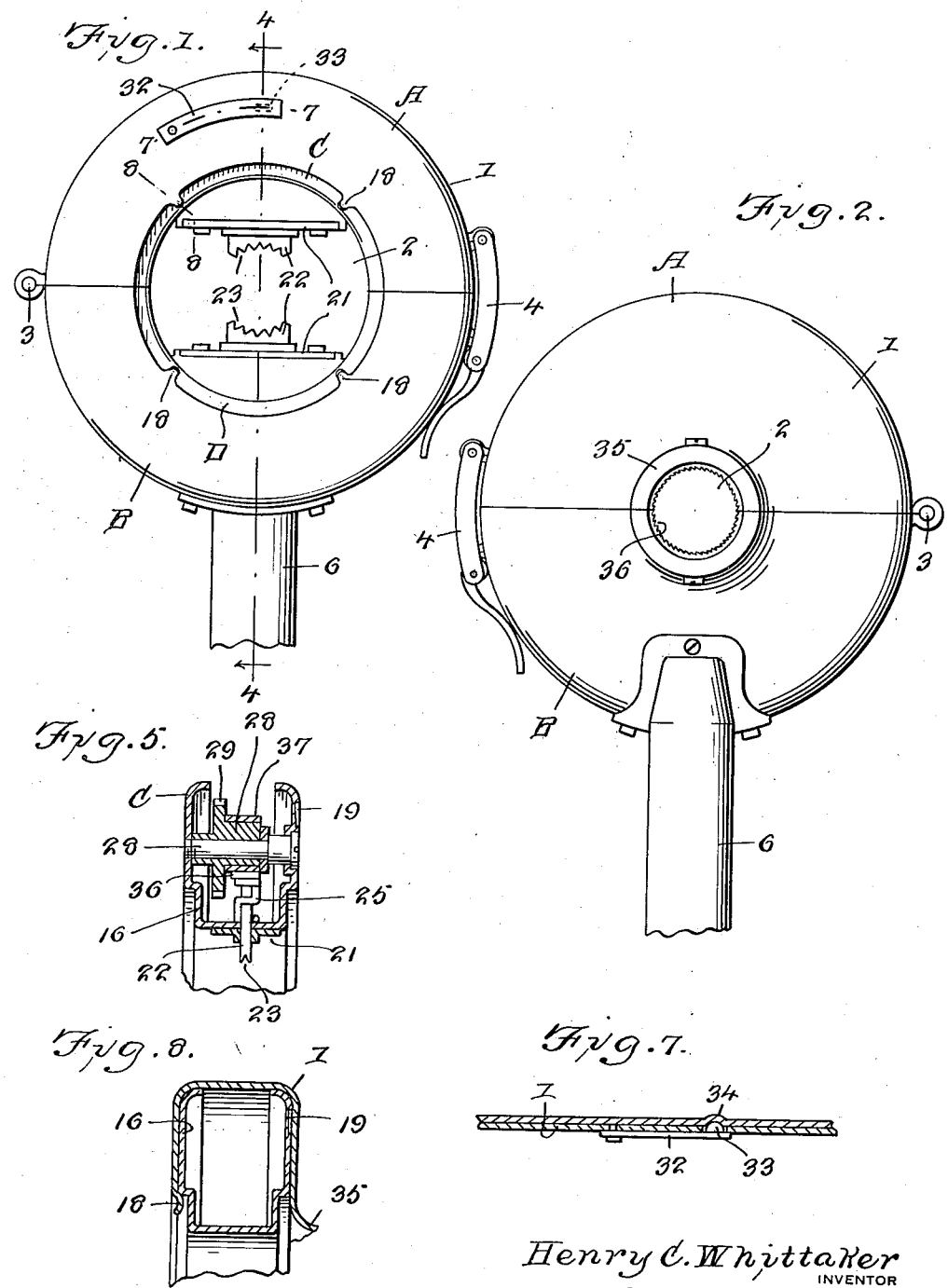
Henry C. Whittaker
INVENTOR
BY Victor J. Evans & Co.
ATTORNEY

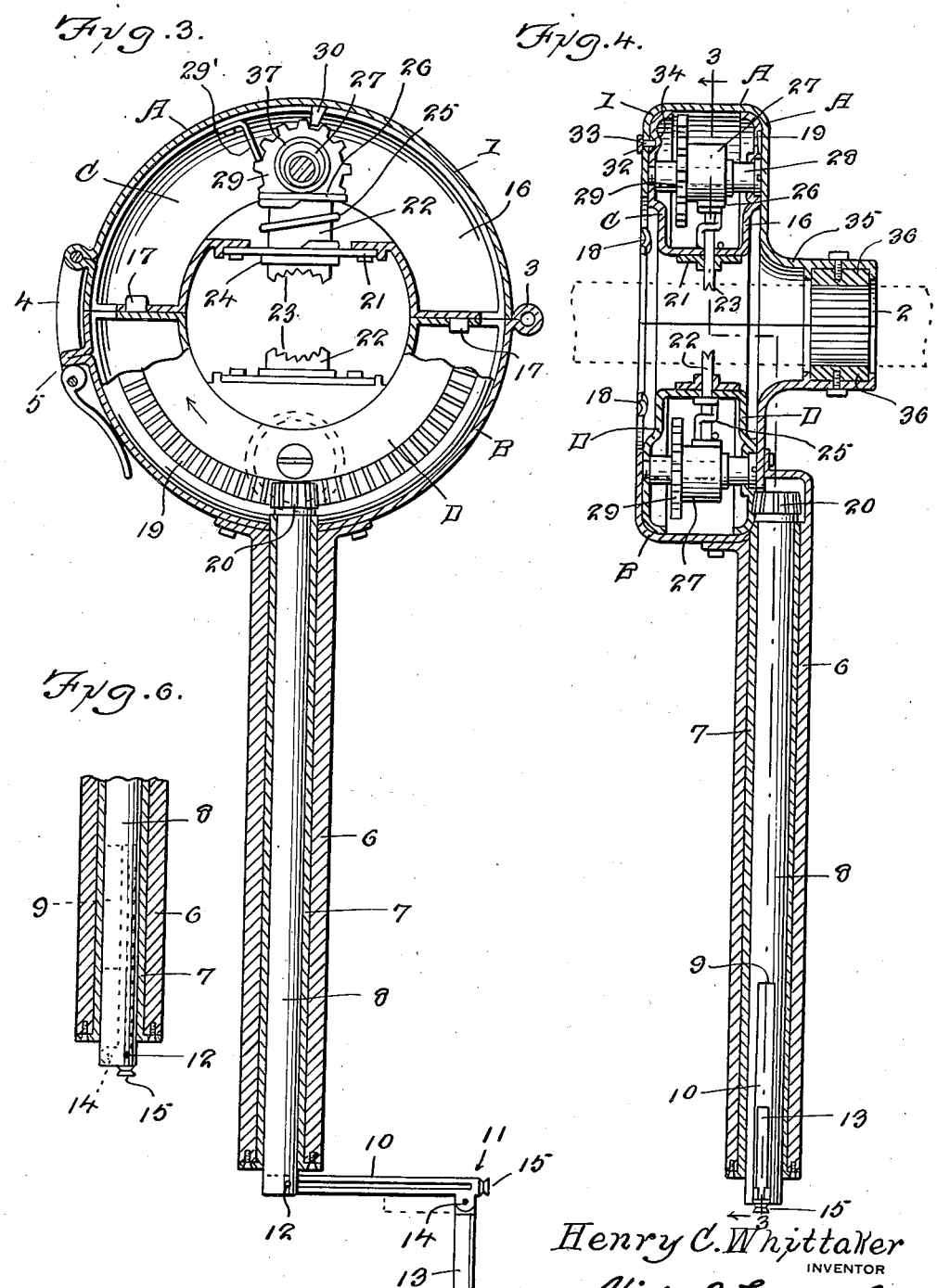

Patented Oct. 26, 1937

2,097,358

UNITED STATES PATENT OFFICE 2,097,358

METAL CUTTER

Henry Clay Whittaker, Memphis, Tenn.

Application May 2, 1936, Serial No. 77,600

1 Claim. (Cl. 30—96)

This invention relates to metal cutters especially adapted for severing tubular metal such as tubing or metallic covering for insulated electric wire and has for the primary object the provision of a portable and durable device of this character which is extremely simple to operate and which will easily cut through the metallic material without cutting or damaging the materials confined therein and which will also permit holding of the tube or metallic covered electric wire during the cutting operation.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a metal cutter constructed in accordance with my invention.

Figure 2 is a view similar to Figure 1, showing the opposite side of the metal cutter.

Figure 3 is a sectional view taken on the line 3—3 of Figure 4, showing the cutters and the mounting and operating means therefor.

Figure 4 is a sectional view taken on the line 4—4 of Figure 1.

Figure 5 is a fragmentary sectional view showing a cam arrangement for advancing the movements of the cutter to a predetermined amount.

Figure 6 is a fragmentary sectional view illustrating the handle of the device with the operating shaft and its crank handle folded and associated therewith.

Figure 7 is a sectional view taken on the line 7—7 of Figure 1.

Figure 8 is a detail sectional view taken on the line 8—8 of Figure 1.

Referring in detail to the drawings, the numeral 1 indicates an annular housing, the opposite side walls of which have aligned work receiving openings 2. The housing is composed of companion sections hinged together, as shown at 3, and detachably connected by a hasp 4 and a keeper 5. The sections of the housing are distinguished from each other by the characters A and B. The section B of the housing has secured thereto a handle 6 of tubular construction communicating with the interior of the housing at one end and has located therein a bearing 7 rotatably supporting an operating shaft 8, one end of which terminates within the housing and the other exteriorly of the handle. Said last-named end has a slot 9 opening outwardly therethrough for the purpose of receiving and confining therein the major portion of a shank 10 of a crank handle 11. The crank handle 11 is pivoted and slidably connected to the shaft 8, as shown at 12, and the hand grip 13 of said crank handle is pivoted to the shank 10, as shown at 14, so that the hand grip may be swung in parallelism with the shank when desired and the shank may be slid into the slot 9 of the shaft. The crank handle when thus assembled in the slot 9 of the shaft only protrudes a very limited distance beyond the free end of the handle 6 and only sufficiently far enough to permit a person to readily grasp the finger piece 15 on the shank for drawing the latter outwardly of the slot 9 and into an operative position for the rotation of the shaft.

A tool head 16 is rotatably mounted within the housing 1 and is composed of semicircular shaped sections C and D matching the sections A and B of the housing. One end of each of the sections C and D has formed thereon a lug 17 to fit in an opening of the other end of the adjacent section, thereby retaining the sections C and D in annular formation and free to rotate within the housing 1. When the housing 1 is opened, that is, the section A swung away from the section B, the sections C and D of the tool head may separate, the section D remaining in the section B of the housing while the section C remains in the section A of the housing. Resilient projections 18 are formed on the sections A and B of the housing and fit in curved portions of the sections C and D of the tool head to retain said sections within the sections A and B of the housing when the latter is in an open position and still permit the tool head to rotate freely within the housing when the latter is closed.

Gear teeth 19 are formed on one side of the tool head and mesh with a pinion 20 secured to the shaft 8 whereby the rotation of the latter will impart rotation to the tool head.

Opposed cutter brackets 21 are removably secured to the sections C and D of the tool head and slidably support cutters 22. The cutters 22 or their active work faces are arranged in opposed relation and may be in the form of thread dies or in the form of teeth 23, as shown in the drawings. Stop collars 24 are secured to the cutters to engage with the brackets 21 for limiting the movement of the cutters away from each other under the influence of springs 25. The outer ends of the cutters are in the form of plates 26 to ride upon cams 27. The cams are journaled on shafts 28 secured to the cutter head and have formed integrally therewith gears or pinions 29 adapted to be given step by step rotation by a tooth or lug 30 formed on the housing 1 during the rotation of the tool head in the housing for the purpose of progressively moving the cutters in the direction of each other as they work upon an article until such cutters move a predetermined distance, this being governed by the high and low faces of the cams and when the cutters or the plates 26 thereof engage with the high faces of the cams the cutters have been moved the limit of their distance of movement in the direction of each other and when the plates of the cutters engage the low faces of the cams the cutters are then moved their maximum distance away from the work or the article on which they are operating. Each gear 29 is engaged by a resilient holding dog 29' to secure said gear against rotation until such time the gear is engaged and moved by the tooth or lug 30.

Secured to the housing 1 is a flexible element 32 carrying at its free end a lug 33 adapted to extend through an opening in the housing and to enter a notch 34 formed in the cutter head. The lug when in the notch positions the sections C and D of the cutter head so that said sections will readily separate on the opening of the housing to permit the device to be placed on and removed from work.

Brackets 35 are formed on one side of the housing 1 and carry jaws 36 to grip the work when extending through the housing and the latter in a closed position. The jaws act as a vise to prevent the work from turning during the rotation of the cutter head.

In operation, the device is adapted to a metallic cylindrical member or any similar form of work, as shown in Figure 4. The work will be held against rotation by the jaws gripping the latter and a person holding the handle 6. The crank handle 11 is then rotated advancing the cutters in engagement with the work and which advancement continues until the cutters sever the work. The cutting action of the cutters continues until the low faces of the cams contact the cutters when said cutters return to non-cutting position, it being understood that during the cutting of the material the cutters rotate about said material due to the cutters rotating within the housing, at the same time the cutters advancing towards each other for a predetermined distance sufficient to sever the work when said cutters return to non-cutting position due to the low face of the cams. Also the cutters advance towards each other or in cutting position by a step by step movement due to the gears 29 striking the lug 30 as they pass said lug.

Each cam may be equipped with a wear sleeve 37 conforming to the contour of the cam.

Having described the invention, I claim:

A tool comprising a housing having a work opening, a cutter head journaled in said housing, cutters slidably supported by the head and capable of moving into cutting and non-cutting positions, springs acting on the cutters to urge them into non-cutting position, cams journaled to the head and engaging the cutters, gears secured to said cams whereby a step by step movement to said gears advances the cutters into cutting action with a step by step movement, resilient holding dogs engaging said gears, and a lug on said housing to engage the gears to impart a step by step rotation thereto during the rotation of the cutter head with respect to the housing.

HENRY CLAY WHITTAKER.